United States Patent Office 3,104,179
Patented Sept. 17, 1963

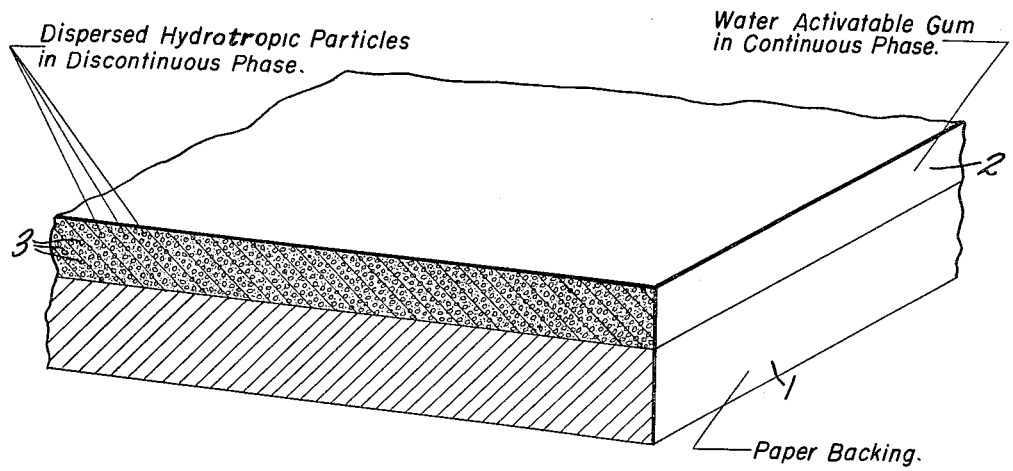

3,104,179
NON-CURLING GUMMED PAPER
Walter L. Prior, Toronto, Ontario, Canada, assignor, by mesne assignments, to Nashua Corporation, a corporation of Delaware
Filed June 27, 1955, Ser. No. 518,347
1 Claim. (Cl. 117—122)

This invention relates to gum compositions for making pregummed sheets, particularly for application to paper and like water-absorbent cellular sheet material to provide articles such as adhesive paper labels having one surface coated with a water-activatable dry adhesive which requires only moistening with water when the paper is to be applied to another surface to become usefully tacky so that the label will adhere to the other surface. This application is a continuation in part of my applications, Serial No. 445,938, filed July 26, 1954, and No. 433,811, filed June 1, 1954, both now abandoned. Such adhesive coatings are commonly characterized as being "remoistenable adhesives" and the gums used as "remoistenable gums."

Hitherto such gummed sheets have been made by preparing a water solution of coatable consistencies of the adhesive, coating it on a paper or like carrier, and drying it. The adhesives usually employed for this purpose are animal glue and starch products, such as dextrins. Gum arabic, carboxymethyl cellulose, polyvinyl alcohol, Lustrex X–700 (a modified styrene polymer of Monsanto Chemical Co.), and other materials, which are also water-activatable in the sense that they become usefully tacky when wet with water, have also been employed. All these materials will be referred to for simplicity as "gums" in accordance with popular usage.

Gummed papers prepared by using a water solution of a gum unfortunately tend to curl when in a dry state. This tendency interferes greatly with the handling of the gummed sheet. The object of this invention is to provide a satisfactory gummed paper, or like article, which will have no tendency to curl after being dried, even when exposed to considerable variations of atmospheric humidity, but which on the contrary will remain perfectly flat indefinitely.

The wetting of paper with non-aqueous liquids will not cause curling of paper, which suggests the use of a water-activatable gum suspended in a non-aqueous liquid, thus eliminating the use of water in applying the coating. However, it is necessary to provide a vehicle for the gum suspension which will cause the gum particles to adhere, when dry, to the paper surface. Water as the suspending liquid or solvent causes the gum particles to become adhesive and to form a coating that will adhere to the paper surface. However, a non-aqueous liquid which does not activate the gum particles cannot perform this function.

In order to solve the binding problem, there has been incorporated a binding agent, such as cellulose acetate or ethyl cellulose, which is soluble in the non-aqueous liquid and which is capable of binding the gum to the surface to which it is applied. However, such binders, being of a nature incompatible with water even when used in minimum amounts, and when moistened acquire no adhesive characteristics in the film form but cover the gum particles with a coating which tends to be non-pervious to water. This prevents the gum from becoming tacky within a reasonable time after water is applied in the ultimate use of the coated paper. A product of this type therefore would not meet the commercial requirement for a pregummed sheet.

It is another disadvantage of the various prior art adhesives that the material to which they are applied must be aged for periods of time before being cut and stored.

It is an object of the invention to provide an adhesive composition which not only can be applied to paper or similar sheet material without causing curling but which also permits the coated material to be cut and stored immediately after drying without the necessity of an aging period.

There may be provided a water-activatable adhesive composition which comprises a dispersion of a water-activatable gum in a non-aqueous liquid containing a relatively small proportion of a binding agent which is normally soluble in, or at least activatable as a binder by, the non-aqueous liquid and which also in the film form is activated upon moistening with water to an adhesive condition and is penetrable by water. The water-activatable gum together with the binding agent provides an adhesive mixture which is activatable by the non-aqueous liquid to provide sufficient tackiness to bind the mixture on a sheet material. Accordingly, when this composition is applied to paper or like sheets and dried by evaporation, there remains a coating of the water-activatable gum and binding agent.

A binding agent is polyvinyl methyl ether which is a linear polymer consisting of methyl vinyl ether units, but obviously any other resinous or like compound having binding characteristics and normally soluble in the non-aqueous liquid used and water-sensitive in film form is suitable, and any such compound is considered to be an equivalent, for the purposes of the invention, of polyvinyl methyl ether.

An object of my invention is to provide a remoistenable adhesive coating for paper which permits the use of binding agents of a wide range of mass solubilities such as those of lesser mass solubility characteristics than polyvinyl methyl ether.

In accordance with my invention, I utilize as a binding agent a potentially adhesive polymeric material water-sensitive in the film form and penetrable but, which may be relatively insoluble in water as a mass and soluble in an organic solvent. I mix intimately therewith, in finely divided form, a hydrotropic agent. A hydrotropic agent is one which, in an aqueous solution, will increase the solubility of a substance in water. For example, those certain binder gums that are sensitive to alkaline solutions, upon contact with a solution of an alkaline hydrotropic agent, are rendered more water-soluble or water-sensitive in the film form and arrive at that condition usually more rapidly than an untreated gum film when moistened with water. Thus, as a result of the treatment with a hydrotropic agent, there may be developed more easily an adhesive tack of commercial potentiality.

The accompanying drawing illustrates the embodiment of my gummed paper product, the cross section thereof illustrating the product components after application to the paper and removal of the solvent. Reference character 1 identifies the paper backing, 2 the gum coating and binder, and 3 the particles of hydrotropic agent dispersed therein.

In accordance with my invention I make an intimate admixture or suspension of hydrotropic agent in the coating composition, so that after application of the latter to the paper the agent is dispersed throughout the dried film and ready to go to work locally, as soon as the moistening water penetrates into the hydrotropic agent to form an effective solubilizing agent. The hydrotropic agent in solid form may be finely ground, and preferably further ground with the chosen gum. The latter may be dry or the agent may be ground or further ground with the gum in a portion of the solvent or into the solution of the gum as circumstances commend, the object being in each instance to provide a very fine state of subdivision and ultimate uniform distribution of the fine particles throughout the volume of the applied coating.

The chosen polymeric material, on evaporation of the organic solvent, preferably forms a film of sufficient water-sensitivity to permit the water used in remoistening to enter the film and penetrate to the hydrotropic particles uniformly distributed throughout the applied coating. The film must also provide an adequate anchorage or binder on the paper for the film and the hydrotropic particles.

My coating composition comprising the binder, the dispersed hydrotropic agent, also gum particles if desired, and the solvent may be coated on the paper in accordance with the practices known in the art. The solvent is then removed leaving the remoistenable gum film adhering to the paper.

It is not inconsistent with the invention that a second binder ingredient be present in the solution, provided that the second binder is water-sensitive and penetrable as otherwise it would prevent proper remoistening of the film as a whole, preventing access of water to the gum and the hydrotropic agent and activation would not be facilitated. Polyvinyl methyl ether is such a suitable second binder material.

The coating of gum with the hydrotropic ingredient admixed therewith and with or without added second binder may also be used as a matrix or binder ingredient in connection with finely divided solid particles of water-soluble gum which are insoluble in the organic solvent involved as, for example, glue, dextrin, etc. I do not claim however to be the first to provide a coating consisting of a gum binder deposited from a solution thereof in an organic solvent, and securing as a major ingredient of the coating finely divided glue or similar water-sensitive gum in itself substantially insoluble in the organic solvent.

In any of these embodiments of the invention various subsidiary ingredients may be added, for instance a clay, such as bentonite, may be added to increase the slip characteristics of the composition when moistened. When dextrin is present in the coatings borax or its equivalents, sodium borate and ammonium borate, may be added in minor amounts to increase the tack of the dextrin on the paper or other sheet material when the coating is moistened.

"The resinous material present may be modified by a plasticizer or softening agent. For example, hydrogenated methyl ester of rosin, dihydromethyl abietate (as marketed by the Hercules Powder Co. under the commercial designation "Hercolyn") is a liquid which will soften the ultimate coating and will increase the number of materials to which the adhesive may be made to stick. Another available plasticizer is a mixture of ortho- and para-toluene sulfonamides (marketed by Monsanto Chemical Co. under the commercial designation "Santicizer #9").

In referring to various materials in this application I, of course, refer to materials of commercial grade. In referring to a gum as water-sensitive, I mean that in film form as applied to a paper backing it is activated to adhesiveness by the ordinary processes of moistening the film with water. Licking a small label with the tongue is a well-known example of activating to adhesiveness. This involves a penetration of moisture into the film to modify the adhesive characteristics and to activate the dispersed particles of hydrotropic agents or gums therein. In speaking of a material as being insoluble, I am not referring to the film form of the material but rather to a mass of non film form and I intend to include within the term, materials which are sparingly soluble as well as those not soluble except in such a great excess of the solvent as to make a solution inapplicable for use. For example, when I refer to an insoluble solid material present in the liquid coatable composition and in the resultant coating, this does not exclude the possibility of a certain amount going into solution in the film form sufficient to cause some adhesiveness and penetration although a significant portion under the conditions existing remains in solid form.

As examples of a non-water-soluble ingredient which is, however, soluble in an organic solvent, I may cite as an example of a resinous material a modified vinyl acetate copolymerized with an acid, such as is marketed by the Monsanto Chemical Co. as "Polymer C-3" and by its subsidiary Shawinigan Products Corporation as "Gelva C-3." Another example is corn protein, marketed under the trade designation "Zein."

Urea is an example of a hydrotropic agent which is an alkaline material not containing an alkali metal. Caustic soda is a primary example of a salt of an alkali metal useful as a hydrotropic agent. Sodium xylene sulphonate, available in the form of a dry powder under the commercial name "Naxonate G" from Wyandotte Chemicals Corporation, is an example of a solid sodium compound believed to have a solubilizing effect on alkaline sensitive gums in the presence of water.

As a binder additive polyvinyl methyl ether is preferred. Vinyl methyl ether-maleic anhydride copolymer and hydroxymethyl cellulose ether might be substituted. When such a binder is used the amount of organic solvent may be increased in compounding the coating composition.

As an organic liquid for dissolving the gum and for carrying the hydrotropic agent, toluene is most generally acceptable. A great many liquids are available, although in a given case they must be chosen with a certain discretion as to their solubilizing characteristics with respect to the particular materials which are being used. The range of choice includes acetone, ethanol, methanol, isopropyl alcohol, methyl ethyl ketone, cyclohexanone and ethyl acetate, and suitable mixtures of such solvents.

Gums which may be added, to be held dispersed in the composition of the film as suggested, include dextrin, animal glue, gum arabic, carboxy methyl cellulose, the ammonia salt of sulfonated polystyrene as supplied by Monsanto Chemical Co. under the commercial designation "Lustrex X-700," and polyvinyl alcohol. Soybean protein, marketed under the commercial designation "mulsoya" and casein may also be used and are susceptible to the presence of the hydrotropic agents.

Examples of the application of certain of these materials in accordance with the principles of the invention are as follows:

*Example 1*

20 parts of Zein
10 parts of Naxonate G
25 parts of ethyl alcohol

In this example the Zein is soluble in the alcohol, but the Naxonate G is only sparingly soluble in the ethyl alcohol when a composition of coatable consistency is prepared. Some of the Naxonate G may react with the proportion of Zein, but the major portion remains as solid material entrained in the Zein to act on the same when the coating is moistened with the water.

*Example 2*

20 parts of Polymer C-3
10 parts of Naxonate G
30 parts of ethyl alcohol
15 parts of toluene The same comments apply to this example, which also illustrates the use of mixed solvents ethyl alcohol and toluene. The Naxonate is substantially completely insoluble in the toluene. The Polymer C-3 is soluble both in ethyl alcohol and in toluene and in the mixture of the solvents.

The following example illustrates the use of added binder ingredients:

*Example 3*

15 parts of polyvinyl methyl ether in 15 parts of isopropanol
30 parts of casein
6 parts of sodium hydroxide
2 parts of urea
30 parts of toluene In a composition like the last example, the hydrotropic agents act upon the casein to amplify and facilitate its adhesiveness. The amount of binder such as polyvinyl methyl ether should preferably be no greater, and desirably less, than half of the solid content of the mixture.

In any of these examples a major proportion of solid water-soluble material such as glue or dextrine may be added.

Example 4

An exemplary formula is 100 parts of corn dextrin
25 parts of Zein
25 parts of Naxonate G
110 parts of ethanol The Naxonate G and the dextrin are ground together in the alcohol.

I am aware that the invention may be embodied in other specific forms without departing from the spirit or essential attributes thereof, and I therefore desire the present embodiment to be considered in all respects as illustrative and not restrictive, as in fact clear in several matters from the description itself. Reference is to be had to the appended claim to indicate those principles of the invention exemplified by the particular embodiment described and which I desire to secure by Letters Patent.

I claim:

A non-curling gummed paper of improved water sensitivity comprising a paper base having adherent thereto a dry non-tacky coating activatable to an adhesive condition by moistening with water, consisting of a gum film formed in situ on the paper from a coatable composition comprising an alkaline sensitive relatively water-insoluble in mass form and water-sensitive and water-penetrable in film form polymeric paper-coatable gum dissolved in an organic solvent and having therein a dispersion of water-soluble alkaline hydrotropic solid discrete particles substantially insoluble in said organic solvent and said gum, the said coatable composition after removal of said organic solvent in situ leaving a gum film having said hydrotropic particles intimately distributed throughout the said gum film whereby upon moistening said gum film with water the water penetrates said gum to activate said hydrotropic particles in situ to act upon said gum and increase the water sensitivity thereof.

References Cited in the file of this patent

UNITED STATES PATENTS

| | | |
|---|---|---|
| 2,194,337 | Veatch | Mar. 19, 1940 |
| 2,331,434 | Sitzler | Oct. 12, 1943 |
| 2,365,020 | Stillwell | Dec. 12, 1944 |
| 2,544,585 | Bruce et al. | Mar. 6, 1951 |
| 2,613,156 | McGaffin | Oct. 7, 1952 |
| 2,624,715 | Wildish | Jan. 6, 1953 |
| 2,793,966 | Davis | May 28, 1957 |